United States Patent [19]

Peterson

[11] Patent Number: 4,558,662
[45] Date of Patent: Dec. 17, 1985

[54] HUMMINGBIRD FEEDER

[76] Inventor: Walter E. Peterson, Box 696, Diablo, Calif. 94528

[21] Appl. No.: 691,211

[22] Filed: Jan. 14, 1985

[51] Int. Cl.⁴ .............................................. A01K 39/02
[52] U.S. Cl. ..................................................... 119/77
[58] Field of Search .......................... 119/77, 51 R, 18

[56] References Cited

U.S. PATENT DOCUMENTS

| | | | |
|---|---|---|---|
| D. 138,103 | 6/1944 | Setzer | D30/2 |
| D. 188,655 | 8/1960 | Blough | D30/2 |
| D. 217,472 | 5/1970 | Lovitz et al. | D30/2 |
| D. 234,144 | 1/1975 | Fassauer | D30/3 |
| D. 236,139 | 7/1975 | Kilham | D30/3 |
| 1,450,494 | 4/1923 | Eummelen | 119/18 |
| 3,125,069 | 3/1964 | Fowler | 119/77 X |
| 3,301,220 | 1/1967 | Queen | 119/77 |
| 3,822,674 | 7/1974 | Tobin | 119/53 |

Primary Examiner—Hugh R. Chamblee
Attorney, Agent, or Firm—Norman B. Rainer

[57] ABSTRACT

Apparatus is provided for converting an empty beverage can of standard design into a device for unattendedly feeding aqueous nutrient to hummingbirds. The apparatus is comprised of holding means for attachment to the bottom of the can to support it pendantly in an inverted position, and a dispensing member which fits over the downwardly disposed open upper extremity of the can. The dispensing member is provided with a flange that engages the upper rim of the can, and an elongated downwardly oriented spout having a small exit aperture.

6 Claims, 3 Drawing Figures

HUMMINGBIRD FEEDER

BACKGROUND OF THE INVENTION

This invention concerns apparatus for the unattended feeding of hummingbirds, and more particularly relates to apparatus adapted to be suspended from a overhead support to deliver controlled amounts of liquid nutrient to a hummingbird.

Many types of devices are known for supplying an aqueous nutrient solution to wild birds. Such devices generally contain a reservoir of nutrient solution, and are designed to release solution on a demand basis, thereby conserving the quantity of solution dispensed. In the case of feeders designed for hummingbirds, special consideration must be given to the fact that the bird has a long slender beak, and remains in hovering motion while feeding.

Accordingly, it is an object of the present invention to provide a device for unattendedly dispensing liquid nutrient to a hummingbird, the rate of liquid dispensed being substantially equal to the rate at which liquid is removed by the hummingbird.

It is another object of this invention to provide a device as in the foregoing objective adapted to be suspended from a overhead support.

It is a further object of the present invention to provide a feeder device of the aforesaid nature of simple and rugged design and low manufacturing cost.

These objects and other objects and advantages of the invention will be apparent from the following description.

SUMMARY OF THE INVENTION

The above and other beneficial objects and advantages are accomplished in accordance with the present invention by a kit adapted to produce a feeding device when associated with a beverage can of metal or plastic having a circular cylindrical sidewall, and substantially flat upper and lower closure panels, said lower panel being recessed toward the interior of the can and bounded by a circular collar of smaller diameter than said sidewall, said upper panel being provided with a pouring aperture communicating with the interior of said can. A circular rim extends outwardly from said sidewall in substantially coplanar alignment with said upper panel.

The kit is comprised of:
 (a) holding means comprised of either a spring like strip provided with at least three angled corners adapted to engage said circular collar, or a disc adapted to be cemented to said lower closure panel, both said strip and disc being fabricated of flat sheet stock and having a centrally located aperture adapted to receive a supportive tether, and
 (b) a dispensing member comprised of a basin panel having a circular perimeter provided with at least one flange adapted to make snap-fitting water-tight engagement with the rim of the can, and an elongated spout tube attached to said basin panel and extending to a distal extremity, the axis of said spout tube substantially intersecting the axis of the can at an angle of between about 120° and 160°, the distal extremity of said tube being provided with a closure cap having an exit aperture of a diameter smaller than the diameter of the spout tube and preferably having a diameter of about ⅛".

The kit is adapted to be marketed as such or in combination with the beverage can. In use, the beverage can, generally of aluminum construction, having been emptied of its original contents, is filled with a aqueous feeding composition containing dissolved sugar, vitamins or other beneficial ingredients. The dispensing member is snapped onto the rim of the cam. A string is caused to be engaged by the aperture in the holding means, preferably by a knot, and the holding means is caused to engage the bottom of the can. The string is then tied to an overhead support, such as the limb of a tree, causing the feeder to be pendantly suspended with the support in a generally downwardly directed position. Once hung, the upwardly directed recess associated with the lower panel of the can is filled with a liquid which will deter ants from descending down the string to forage upon the liquid feeding composition within the can. As the hummingbird withdraws liquid from the device, air enters the exit aperture and rises to the inverted bottom of the can, thereby permitting subsequent removal of liquid.

In preferred embodiments, the holding means is a spring-like piece of sheet metal of elongated rectangular configuration, providing four angled corners which grip the circular collar of the can. The piece of sheet metal has a length such as to require flexed bending to fit within said circular collar. The dispensing member is preferably of monolithic construction, having been fabricated by a molding operation utilizing a thermoplastic resin. The dispensing member may have two or more flanges of different diameter in concentric disposition, thereby enabling the dispensing member to fit cans of different sizes.

BRIEF DESCRIPTION OF THE DRAWING

For a fuller understanding of the nature and objects of the invention reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
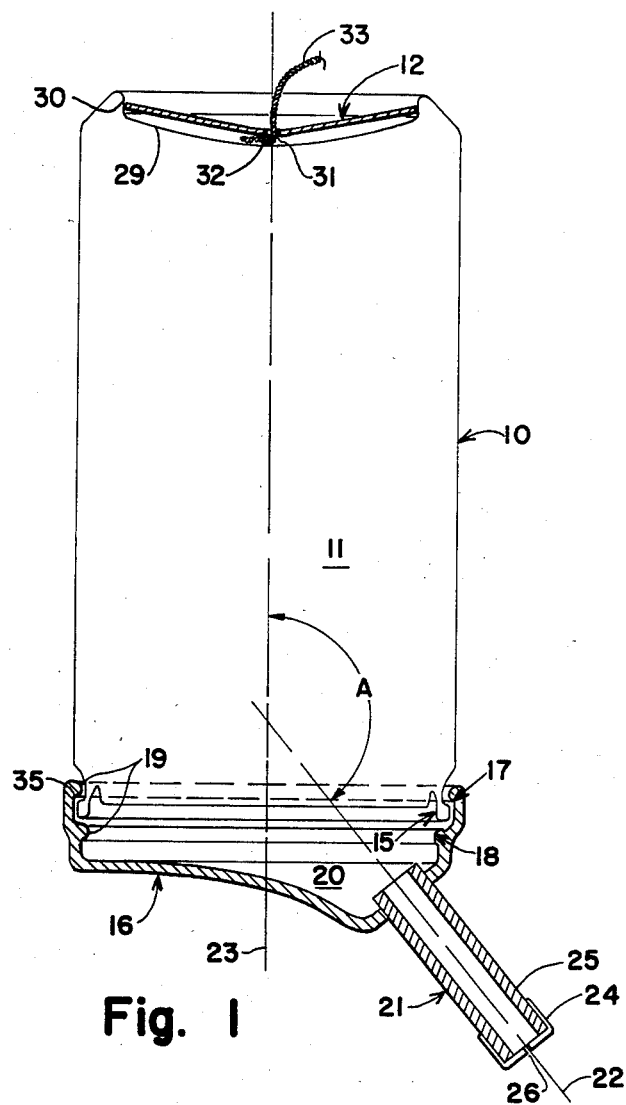
FIG. 1 is a side view of an embodiment of the kit of this invention in operative association with a beverage can to form a feeding device.
Figure 2:
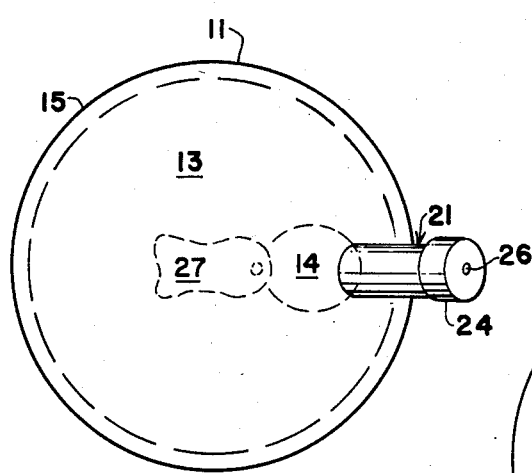
FIG. 2 is a bottom view of the feeding device of FIG. 1.
Figure 3:
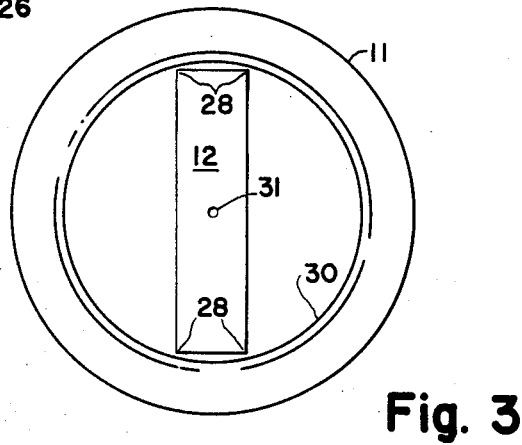
FIG. 3 is a top view of the feeding device of FIG. 1.

Referring to the drawing, an embodiment of the feeding device 10 of the present invention is shown comprised of beverage can 11 suspended by holding means in the form of spring-like metal strip 12 in a manner such that upper panel 13 of said can, containing pouring aperture 14 and surrounded by outwardly projecting rim 15, is downwardly disposed.

A dispensing member 16 of integral monolithic construction is releasibly attached in a fluid-tight manner to said can, said attachment being achieved by snap-fitting engagement of first annular flange 17 of said dispensing member with rim 15. A second annular flange 18 is provided for use with cans having rims of smaller diameter. It is to be noted that each flange is comprised of an inwardly protruding ridge 19 adapted to pass over rim 15 and lock in abutment with the lower shoulder 35 of said rim.

The dispensing member is further comprised of basin portion 20 and spout tube 21 which communicates with said basin portion at the lowermost portion thereof. Spout tube 21, shown as a circular cylindrical tube, is disposed in a manner such that its axis 22 intersects axis 23 of said cam at an angle A having a value between about 120° and 160°. Such value of angle A causes the spout tube to be downwardly angled between 30 and 70 degrees from horizontal. A closure cap 24 is affixed to the distal extremity 25 of said spout tube. An exit aperture 26 is centered in cap 24, the diameter of said aperture being smaller than the diameter of spout tube 21. The dispensing member may be fabricated as an integral monolithic structure by injection molding techniques utilizing thermoplastic polymers such as polyethylene, acrylonitrile-butadiene-styrene interpolymers, generally called ABS plastics, and other stiff but resilient thermoplastic polymers. The dispensing member may be fabricated of translucent or transparent plastic to facilitate visual inspection for assuring proper operation of the feeding device.

The can utilized in the illustrated embodiments is of standard design, fabricated of thin aluminum and provided with an opening tab 27 that may remain affixed to the can after formation of pouring aperture 14. The kit of this invention may also be utilized with can-like beverage containers fabricated of plastic, and provided with different opening tab designs.

Holding means 12, shown having a rectangular periphery with four gripping corners 28, is fabricated of a reasonably rigid yet resilient metal such as steel or aluminum. When pressed by thumb pressure into the recess 29 of the bottom of the can, the corners dig into collar 30 circumscribing said recess. Once positioned in such manner, the holding means cannot be dislodged by the ordinary weight of the feeder device when the can is filled with nutrient solution. A centrally located aperture 31 in said holding means permits engagement by the knotted extremity 32 of tether string 33. In other embodiments, the holding means may have the form of a substantially flat disc which is adhered to the lower panel of the can.

While particular examples of the present invention have been shown and described, it is apparent that changes and modifications may be made therein without departing from the invention in its broadest aspects. The aim of the appended claims, therefore, is to cover all such changes and modifications as fall within true spirit and scope of the invention.

Having thus described my invention, what is claimed is:

1. A kit adapted to produce a hummingbird feeder device when associated with a beverage can having a circular cylindrical sidewall, upper and lower closure panels, and a circular rim extending outwardly from said sidewall in substantially coplanar alignment with said upper panel, said lower panel being recessed toward the interior of the can and bounded by a circular collar of smaller diameter than said sidewall, and said upper panel being provided with a pouring aperture communicating with the interior of the can, said kit being comprised of:
   (a) holding means adapted to non-penetratively engage the lower closure panel or associated circular collar of said can, fabricated from flat sheet stock, and having a centrally located aperture, and
   (b) a dispensing member comprised of a basin panel having a circular perimeter provided with at least one flange adapted to make snap-fitting water-tight engagement about the rim of the can, and an elongated spout tube attached to said basin panel and extending to a distal extremity, the axis of said spout tube substantially intersecting the axis of the can at an angle of between about 120° and 160°, the distal extremity of tube being provided with an exit aperture of a diameter smaller than the diameter of the spout tube.

2. The kit of claim 1 wherein said holding means is a spring-like metal strip having a least three angled corners adapted to engage said circular collar.

3. The kit of claim 1 wherein said holding means is a disc adapted to be cemented to said lower closure panel.

4. The kit of claim 1 wherein the exit aperture of said spout tube has a diameter between 1/16" and 3/16".

5. The kit of claim 1 wherein the distal extremity of said spout tube is provided with a closure cap containing said exit aperture.

6. A device for dispensing liquid nutrient to hummingbirds comprising:
   (a) a beverage can having a circular cylindrical sidewall, upper and lower closure panels, and a circular rim extending outwardly from said sidewall in substantially coplanar alignment with said upper panel, said lower panel being recessed and bounded by a circular collar of smaller diameter than said sidewall, and said upper panel being provided with a pouring aperture,
   (b) holding means adapted to non-penetratively engage the lower closure panel or associated circular collar of said can, fabricated from flat sheet stock, and having a centrally located aperture, and
   (c) a dispensing member comprised of a basin panel having a circular perimeter provided with at least one flange adapted to make snap-fitting water-tight engagement about the rim of the can, and an elongated spout tube attached to said basin panel and extending to a distal extremity, the axis of said spout tube substantially intersecting the axis of the can at an angle of between about 120° and 160°, the distal extremity of said tube being provided with an exit aperture of a diameter smaller than the diameter of the spout tube.

* * * * *